Patented Aug. 25, 1936

2,052,391

UNITED STATES PATENT OFFICE 2,052,391

LIQUID COATING COMPOSITIONS

Herbert A. Endres, Silver Lake, Ohio, assignor to Wingfoot Corporation, Wilmington, Del., a corporation of Delaware No Drawing. Application September 18, 1934,
Serial No. 744,558

25 Claims. (Cl. 134—17)

This invention relates to improvements in liquid coating compositions made from condensation derivatives of rubber. It includes the new liquid coating compositions, methods of preparing them and their application.

The liquid coating compositions of this invention may be made from condensation derivatives of rubber the preparation of which is described in my prior applications Serial Number 635,686, filed October 1, 1932, and Serial Number 701,376 filed December 7, 1933, of which this application is in part a continuation. The condensation derivatives may be essentially hydrocarbons or they may contain a small amount of one or more other elements such as a halogen, etc.

The rubber condensation derivative may, for example, be prepared by dissolving rubber, preferably milled pale crepe rubber, in benzene or other rubber solvent to give a concentration approximating 10% rubber by weight. This cement is heated in a steam-jacketed, or preferably a water-jacketed Day mixer or similar apparatus. If the halide of an amphoteric metal, such as tin tetrachloride is used as the conversion agent the cement is boiled until a cement of reduced viscosity is obtained before the conversion agent is added. If hydrochloric acid is used with such a halide, or a compound such as chlorostannic acid is employed, such preboiling of the cement is unnecessary. Approximately 10% by weight of a conversion reagent, such as tin tetrachloride or hydrated chlorostannic acid, $H_2SnCl_6.6H_2O$, may be added to effect the condensation. This may be prepared by saturating tin tetrachloride with hydrogen chloride at zero degrees centigrade. If the halide of another amphoteric metal is employed the same relative amount of hydrochloric acid may be used although more or less hydrochloric acid may be employed and the halogen content of the rubber derivative varied. The condensation may be effected by heating and agitating the mixture of the rubber cement and conversion agent for a period of from 2 to 6 hours at temperatures between 65 and 80° C., but at any event near the boiling point of the solvent.

The temperature at which the conversion of the rubber to the rubber derivative is effected and other factors will control the nature of the rubber derivative produced. A product of higher or lower softening point may be obtained. After the reaction has been carried to the desired point the reaction product may be freed from water-soluble impurities by "quenching" in a large volume of water, that is by pouring it into water maintained in a state of agitation. If only a small amount of water is used an emulsion will be obtained in which the water forms the discontinuous phase and the solution in the organic solvent forms the continuous phase. If, on the other hand, a large volume of water is employed, the water will form the continuous phase and the solution in the organic solvent will form the discontinuous phase. By "quenching" is meant the use of sufficient water to form the latter type of emulsion and sufficient agitation is employed to produce a more or less fine emulsion. Heat at a temperature in the neighborhood of the boiling point of the solvent is then applied, whereupon the solvent evaporates leaving the rubber derivative as a finely divided precipitate. Illustrative of this step 25 pounds of reacted cement originally containing 10% rubber are placed in a container holding 28 gallons of cold water agitated by suitable means, such as a propeller blade, rotating at the rate of approximately 240 R. P. M. The container is then closed and steam introduced at such a rate that the vapor temperature in an ordinary column extending from the container to a condenser reaches 150° F. in 10 minutes. During the next 10 minutes the temperature is allowed to rise to 160° F., during which interval the majority of the solvent distills off. The temperature is then increased to 200–210° F. in the next five minutes and permitted to remain there for another five minutes, during which practically all of the remainder of the solvent distills off. By such removal of the solvent the rubber derivative is precipitated in a finely divided sand-like form and may then be centrifuged, washed with water and dried in a vacuum oven. By varying the rate of distillation and agitation the size of the particles of the rubber derivative may be controlled. Sand-like particles will in general be satisfactory.

In carrying out the reaction it is desirable to maintain reducing conditions or to at least exclude the air as much as possible. For example, in the reaction vessel in which the rubber cement is treated with the conversion agent it will ordinarily be desirable to substantially fill the vessel with the rubber cement and reagent and thus reduce to a minimum the amount of air in the vessel. It is desirable to remove the reacted cement from the reactor as soon as possible after the reaction has been completed. In transferring the reacted cement from the reaction vessel to the quenching tank, contact with air is to be prevented so far as possible. A reducing agent, such as sodium sulfite or hydroquinone, etc. is advantageously added to the quenching water so as to prevent oxidation by air dissolved in the quenching water and also prevent oxidation in the subsequent heating step in which the solvent is volatilized. The quenching operation should not be unduly extended. In this way the rubber derivative may be obtained in a substantially unoxidized condition free from water-soluble impurities and by using construction materials not attacked by the conversion product a substantially completely colorless product is produced. By this procedure the rubber derivative is produced in a finely divided form in which a large surface is exposed to the oxidizing action of the air. If this material is to be stored, an air-tight container is advantageously used, or preferably the material is stored in an inert atmosphere. The material is advantageously milled soon after production to produce an agglomerated mass in which much less surface is exposed to the atmosphere than in the finely divided state in which the material is prepared. Although all of these precautions are advantageously observed, a substantially unoxidized product for use in coating compositions may be obtained even though some slight oxidation occurs.

The rubber derivative is preferably produced from rubber by the reaction of chlorostannic acid.

A rubber cement is prepared by dissolving in benzene 10% by weight of pale crepe rubber which has been plasticized to a condition such that a $\frac{3}{16}$ cubic inch heated sample thereof when placed on a flat plate beneath a flat 10 kilogram weight for 2½ minutes in a cabinet heated to a temperature of 70° C. is flattened out to a thickness slightly less than ⅛ inch. This corresponds to a plasticity of about 300 as measured by a Williams plastometer.

Three hundred and fifty gallons of the cement so prepared is treated with 10% of chlorostannic acid in a Day mixer equipped with an agitator and reflux condenser and heated and agitated for a period of about 3 hours at between 65 and 80° C. Samples are then taken every few minutes and the viscosities determined by suitable means. The reaction is continued until cement of a predetermined viscosity is obtained. In general a reaction period of about 6 hours will be required although this varies from batch to batch.

Any viscosity instrument may be used in making the determination. One satisfactory instrument is a Gardner mobilometer which measures the viscosity of a sample in terms of the time in minutes required for a plunger of known weight and area to fall a known distance in a cylinder of known volume containing the test sample, the clearance between the plunger and the wall of the cylinder being known. All readings in such an instrument are taken at a standard temperature, a temperature of 25° C. being selected for the determinations recorded herein. The mobilometer used had the following dimensions:

| | |
|---|---|
| Thickness of plunger | 0.066 inches |
| Diameter of plunger disc | 1.502 inches |
| Diameter of plunger shaft | 0.248 inches |
| Inside diameter of cylinder containing test sample | 1.535 inches |
| Height of cylinder | 9.0 inches |
| Length of plunger shaft | 20.0 inches |
| Distance between the two marks on plunger shaft | 7.484 inches |
| Total weight of shaft, top weight and disc | 68.6 grams |

When the viscosity of the cement reaches a point about .05 to .07 minute above the desired final viscosity, which is generally 0.30±0.10 minute, preferably 0.28 to .32 minute, the reaction is preferably stopped by the addition of 40 grams of sodium hydroxide (dissolved in water) per pound of chlorostannic acid used in the reaction, or by the addition of one pint of water per pound of chlorostannic acid used. The batch is then cooled and filtered and quenched in water containing, for example ¾ ounce of sodium sulfite per gallon. The benzene is removed from the resulting emulsion by steam distillation as described.

The preferred product made by this process has a softening point between 45 and 65° C. and liquefies at a temperature above 150° C. When milled it is soluble (completely dispersed) in aromatic solvents, such as benzene, toluene, coaltar naphtha, etc., turpentine and turpentine substitutes and petroleum distillates, except very low boiling petroleum ether. It is insoluble in alcohol, acetone and the commonly used lacquer solvents. It is no darker than light amber in color in granular form and is substantially clear and colorless in films 25 to 30 microns in thickness. The chlorine content is about 1.0 to 1.2%. When applied as a lacquer, by brushing or spraying, it dries rapidly to give an oxidized film.

In general, coating compositions made from this condensation derivative of rubber show remarkable resistance to acids, alkalis and corrosive chemicals. They also very effectively withstand moisture penetration as proved by salt water spray and immersion tests on both iron and steel panels. Films from enamels adhere extremely well to metals, concrete, glass and wood.

The condensation derivative is tasteless, odorless and non-toxic and has excellent electrical properties. Its base color is light enough so that all manner of bright-colored enamels can be readily developed. The film which is secured is hard and flexible and exhibits remarkable adhesion to the surface to which it is applied. The coating compositions may be applied by brushing, spraying or dipping.

The viscosity of the solution depends upon the solvent employed. Turpentine solutions are the most viscous; those using petroleum solvents are intermediate, with coal-tar naphtha giving the least viscosity. The brushing resistance of these solutions is higher than for most linseed oil paints. At the same time, the covering capacity is some 75% greater. Generally speaking, a 30% solution in mineral spirits can be brushed; but this should be thinned to a concentration of 25 or 20% for spraying.

Coating compositions made with low boiling solvents quickly set to the touch and gradually oxidize to form hard, glossy but flexible films. This hardening effect is accelerated by exposure to light; by baking; and by the use of metallic soap driers. Acidic pigments such as titanium dioxide, iron oxide, and chromium-oxide also hasten the hardening process, in contrast to the well-known effect in linseed oil paints. If it is not carried too far, this drying effect improves the efficiency of the coating for all sorts of difficult service, such as resistance to scraping and abrasive wear and the ability to withstand the solvent effect of oil and gasoline.

Films made from the condensation derivative dissolved in mineral spirits can be rendered impervious to their own solvent by baking. For air drying the same result can be obtained by the judicious use of mild drying agents, such as manganese or lead-manganese driers, or by the incorporation of titanium dioxide.

The following remarks apply to plasticizers which may be employed in these coating compositions.

*Ethyl abietate.*—Compatible up to 30 parts per 100 of the condensation derivative. Has a tendency to become brittle on ageing.

*Butyl stearate.*—Compatible up to 30 parts per 100 of the condensation derivative. Gives flexible films with good adhesion. Shows a tendency to soften on ageing.

*Castor oil.*—Limit of compatibility less than 10 parts per 100 of the condensation derivative.

*Santolite* (A plasticizer, probably an aryl phosphate, manufactured by Resinous Products and Chemical Company of Philadelphia).—Limit of compatibility less than 10 parts per 100 of the condensation derivative.

*Paraplex* (A plasticizer manufactured by Resinous Products and Chemical Company of Philadelphia).—Limit of compatibility less than 10 parts per 100 of the condensation derivative.

*Tri-cresyl phosphate.*—Highly compatible, but when used in amounts greater than 20 parts per 100 of the condensation derivative the films are too soft for average purposes.

*Rezyl balsams* (Modified glycerol phthalates made by the American Cyanamid Company).— No. 33 is essentially incompatible, the limit being less than 1%. No. 53 is compatible up to 15 parts per 100 of the condensation derivative. It is an effective softener and gives tough films which age very well and are not affected by exposure to ultraviolet light for 100 hrs. It does not however, lend itself well to baked finishes because it does not prevent the film from becoming brittle under these conditions.

*Chlorinated diphenyls.*—Aroclors #1254, #1262, and #4465 are quite compatible, the limits being above 30 parts per 100 of the condensation derivative. They have a tendency to cause yellowing when exposed to ultraviolet light or direct sunlight. Films plasticized with them do not become brittle on baking, but they also do not air-dry entirely tack free. No. 4465 gives the toughest films.

*Paracoumarone-indene resins.*—Materials of this type, such as the Cumar and Heville resins are highly compatible. They can be used in either air drying or baking finishes, especially when acid and alkali resistance are required.

*Paraffin.*—Compatible up to about 25 parts per 100 parts of the condensation derivative. This is an effective softener and when used in smaller amounts it gives very tough films. It can be used in either air-drying or baking finishes.

The above compatibility limits are affected by the addition of driers and pigments, and are to a certain extent dependent upon the solvent employed. They are, therefore, not absolute values.

Very satisfactory results have been obtained, especially in baking primers and enamels, by modifying the condensation derivative with drying oils. The following suggestions are offered in this connection.

*Raw Chinawood oil.*—Compatible up to about 20 parts per 100 of the condensation derivative. This can be increased by the addition of some linseed oil. Small amounts (5%) of Chinawood oil improve the ageing qualities and weather resistance of the film and are particularly effective in air drying finishes for use on metal. In baking primers and enamels the oil content can be increased to 35 parts per 100 of the condensation derivative without reducing the gloss if the material is baked immediately after application. If gloss is immaterial, or if a flat finish is desired, the oil content can be increased to above 50 parts per 100 of the condensation derivative. The addition of metallic soap driers will frequently increase the rate of drying of the oil and condensation derivative sufficiently to prevent the separation of the oil and its migration to the surface, and thus result in a glossy finish, when without driers the finish would air dry or bake out flat. For this purpose the manganese and lead manganese driers have given the best results.

Heat treated Chinawood oil is somewhat more compatible than the raw oil, but the mechanical properties of the film are poorer. However, when the degree of oil modification is to exceed 5% on the weight of the condensation derivative and the finish is to be baked out in an open-flame gas-fired oven, heat-treated oil must be used to prevent wrinkling.

*Linseed oil.*—In general, a boiled linseed oil containing lead manganese drier (about 0.2% metal) and having a viscosity between tubes A and B (Gardner-Holdt) has been found to give satisfactory results in both air-drying and baking finishes. Such an oil will dry in 14 to 18 hours depending upon conditions, but when used to modify the condensation derivative in an enamel this time is reduced to 2–4 hours. The condensation derivative has a very pronounced effect on the rate of gelation of the oil. For example, the following white enamel will set to touch in about 4 hours under ordinary conditions.

| | |
|---|---|
| Condensation derivative | 100 |
| Titanium dioxide | 192 |
| Zinc oxide | 48 |
| Boiled linseed oil | 200 |
| Turpentine | 275 |

The limit of compatibility of this oil varies from 100% to 300% on the condensation derivative, depending upon the quantity and type of pigments used in the formulation. The use of this oil is recommended as a modifying agent in enamels for use on wood. In combination with Chinawood oil it has given very good results in baking primers and enamels, of which the following are examples:

Red baking primer (Rust inhibitive)

| | |
|---|---|
| Condensation derivative | 100 |
| Red iron oxide | 50 |
| Zinc chromate | 50 |
| Asbestine, silica, or other inert material | 75 |
| Raw Chinawood oil | 50 |
| Boiled linseed oil | 50 |
| V. M. & P. naphtha | 400 |

Baking schedule:—30 minutes at 300° F.

Red baking enamel (Rust inhibitive)

| | |
|---|---|
| Condensation derivative | 100 |
| Red iron oxide | 40 |
| Zinc chromate | 60 |
| Raw Chinawood oil | 35 |
| Boiled linseed oil | 50 |
| 20% solution Pb-Mn Soligen drier | 15 |
| V. M. & P. naphtha | 300 |

Baking schedule:—20 minutes at 300° F.

It should be noted that, while modification with drying oils is in many cases highly desirable, these oils reduce the resistance of the condensation derivative to moisture and corrosive chemicals and should therefore not be employed when maximum resistance is required.

To serve as typical illustrations of coating compositions suitable for commercial use, the formulations for a number of coatings are listed below. These tabulations give the composition on the basis of 100 parts of the condensation derivative and in pounds per gallon. The manner of preparation from pre-formed bases is also indicated. These bases should be used according to weight in order to secure the composition which the particular formula demands. Each base consists of the condensation derivative into which a certain amount of pigment or inert matter has been incorporated by milling on a rubber mill. Formulae for preparing the various bases are given after the formulae for the coating compositions. Additional pigment or inert material may be added to a base by milling. In preparing a coating composition from the condensation derivative or a prepared base, the dry ingredients may all be milled into a homogeneous mass and this mass may then be readily dissolved in the vehicle to form the coating composition, without grinding on a paint mill (except in a few cases such as noted in the following formulae where grinding on a paint mill is desirable).

Milling the condensation derivative produces a more uniform and more readily soluble product probably due to the fact that the surface of a condensation derivative prepared as described is oxidized so that each particle of the derivative is enclosed in a somewhat oxidized layer. This oxidized layer is broken down by milling and the material is thus peptized so that it goes into solution readily. The condensation product should therefore be milled before using in a coating composition even though no pigment or filler is milled into it. Directions for compounding various bases mentioned in the following formulae are given following the formulae for the coating compositions.

*Formula 1—Black—For exterior and interior use on iron and steel*

Characteristics.—Color—Black. High gloss. Becomes gasoline resistant after exposure to direct sunlight for several weeks. Chalks slightly on exposure to weather, but can be polished to a high gloss. Resists chemical action as well as Formula 2 but is not as hard. Very good resistance to abrasion.

Application.—For brush application, thinning is not required. For spray application, the material should be thinned 10 percent with mineral spirits. Sets to touch in about one hour, but requires several days to dry hard. Two or three coats should be applied with a minimum amount of brushing, allowing two hours between coats. Baking for 30 to 45 minutes at 200 degrees F. improves gloss and adhesion, and increases hardness.

| Material | Parts by weight | Pounds per gallon |
|---|---|---|
| Condensation derivative | 100 | 1.70 |
| Carbon black | 30 | .51 |
| Raw tung oil | 5 | .08 |
| Mineral spirits | 300 | 5.09 |
| | 435 | 7.38 |
| From base | | |
| Base B | 130 | 2.21 |
| Raw tung oil | 5 | .08 |
| Mineral spirits | 300 | 5.09 |
| | 435 | 7.38 |

*Formula 2—Acid and alkali resistant black*

Characteristics.—Color — black. Medium-low gloss. Resists hydrochloric acid, nitric acid, sodium and potassium hydroxides of any concentration. Resists 50% sulphuric acid, but is quickly attacked by the concentrated acid. Very good resistance to salt spray and corrosive chemicals in general. Will not resist gasoline and oil. For interior and exterior use.

Application.—For brush application, thinning is not required. For spraying, material should be thinned 10 to 20 percent with mineral spirits.

This material sets to touch in about 1 hour, but requires about 48 hours to dry hard. Two or three coats should be applied with a minimum amount of brushing, allowing two hours between coats. Films should be allowed to dry five days before using subjected to corrosion tests. May be force-dried in 1 to 2 hours at 140 degrees F.

Unlike the majority of bases, the carbon black-china clay Base N from which this paint is made does not disperse readily in the solvent, and a paint mill should be employed to obtain maximum smoothness.

| Material | Parts by weight | Pounds per gallon |
|---|---|---|
| Condensation derivative | 100 | 1.51 |
| Carbon black | 30 | .48 |
| China clay | 60 | .96 |
| Raw tung oil | 5 | .08 |
| Mineral spirits | 300 | 4.81 |
| | 495 | 7.94 |
| From bases | | |
| Base N | 190 | 3.05 |
| Raw tung oil | 5 | .08 |
| Mineral spirits | 300 | 4.81 |
| | 495 | 7.94 |

*Formula 3—White acid and alkali resistant enamel*

Characteristics.—This product has been formulated to be used in the interior of caustic tank cars. A practical test which has been in service for several months indicates the outstanding superiority of the material for this purpose. A modification of Formula 3 contains toluol as a solvent instead of mineral spirits.

Application.—The car should first be thoroughly cleaned by sandblasting, after which the seams are caulked, and all seams and rivets carefully covered with the composition applied with a brush. Four coats are then applied over the entire inner surface of the car. If applied by spraying, equal parts of Formula 3 and the modification using toluol as a solvent are employed, thinned as necessary with mineral spirits (approximately ¾ pint per gallon) depending upon the type of spray gun.

These four coats are applied as rapidly as the material dries to touch. Then, after the fourth coat has been applied, a blower is inserted in the end manhole of the car so that a good volume of air is forced through the car. Care should be exercised, however, to see that the air stream does not impinge directly against the surface at any point. This will cause too rapid drying, and may result in lifting or alligatoring. When the air is turned on, steam is run through the coils, bringing the temperature up to approximately 140 degrees F. As soon as this temperature is reached the heat is turned off and the car is kept at about this temperature for a period of about twelve hours under draft, or until all the odor of solvent is absent from the exhaust air. At the end of this time the film should be fairly hard and ready for service.

| Material | Parts by weight | Pounds per gallon |
|---|---|---|
| Condensation derivative | 100.0 | 1.61 |
| China clay | 60.0 | .97 |
| Titanox "C" | 32.5 | .52 |
| Raw tung oil | 5.0 | .08 |
| Mineral spirits | 300.0 | 4.85 |
|  | 497.5 | 8.03 |
| From bases | | |
| Condensation derivitive | 22.5 | .36 |
| Base I | 120.0 | 1.94 |
| Base L | 50.0 | .80 |
| Raw tung oil | 5.0 | .08 |
| Mineral spirits | 300.0 | 4.85 |
|  | 497.5 | 8.03 |

Formula 4—Green enamel

*Characteristics.*—This material was formulated for use as a coating for plating room equipment.

*Application.*—For brush application, thinning is not required. For spray application, thin 10 to 20 percent with mineral spirits.

Sets to touch in about one hour, but requires about 48 hours to dry hard; two or three coats should be applied with a minimum of brushing, allowing two hours between coats. Films should be allowed to dry five days before being subjected to corrosion tests.

| Material | Parts by weight | Pounds per gallon |
|---|---|---|
| Condensation derivative | 100 | 1.77 |
| Titanium dioxide | 25 | .44 |
| Chrome green (oxide) | 175 | 3.09 |
| Superfloss silica | 25 | .44 |
| Raw tung oil | 5 | .09 |
| Mineral spirits | 250 | 4.40 |
|  | 580 | 10.23 |
| From bases | | |
| Condensation derivative | .8 | .02 |
| Base A | 38.5 | .70 |
| Base J | 250.0 | 4.40 |
| Base H | 35.7 | .62 |
| Raw tung oil | 5.0 | .09 |
| Mineral spirits | 250.0 | 4.40 |
|  | 580.0 | 10.23 |

Formula 5—Dove gray enamel

*Characteristics.*—This material is formulated as a coating for plating room equipment.

*Application.*—For brush application, thinning is not required. For spray application, thin 10 to 20 percent with mineral spirits.

Sets to touch in about one hour, but requires about 48 hours to dry hard. Two or three coats should be applied with a minimum amount of brushing, allowing two hours between coats. Films should be allowed to dry five days before subjecting to corrosion tests.

This material is formulated by tinting 100 parts by weight of Formula 17 white with 4.2 parts of Formula 1 black.

Formula 6—Red air drying metal enamel

This material was formulated as an exterior paint for alkali tank cars. It is very resistant to alkalies, and to occasional spillage of acids. This material is of proper consistency for spray application. If thinning becomes necessary use mineral spirits, solvent naphtha, or toluol. Apply one mist coat, air-dry five minutes, and apply one wet coat. The coating sets to touch in one hour and dries hard in 24 hours. It can be force-dried for 15 minutes at 200 degrees Fahrenheit.

| Material | Parts by weight | Pounds per gallon |
|---|---|---|
| Condensation derivative | 100 | 1.56 |
| Indian red oxide | 150 | 2.33 |
| Raw tung oil | 25 | .39 |
| Mineral spirits | 300 | 4.67 |
|  | 575 | 8.95 |
| From bases | | |
| Base E | 250 | 3.89 |
| Raw tung oil | 25 | .39 |
| Mineral spirits | 300 | 4.67 |
|  | 575 | 8.95 |

Formula 7—Aluminum—For interior or exterior use on iron and steel

*Characteristics.*—Lustre improves on exposure to weather. Very hard and does not collect as much dust and dirt as ordinary aluminum paints. Excellent resistance to salt spray and alternate salt water immersion and weather exposure.

*Application.*—For brush application thinning is not required. For spraying, material should be thinned by diluting the vehicle 10% with mineral spirits before adding the aluminum powder.

This material sets to touch in about one hour and can be recoated in 4 hours. Dries hard in 24 hours. Can be baked 5 minutes at 300 degrees F. or 15 minutes at 200 degrees F. to produce a very hard finish. In making aluminum paint the powder is added to the vehicle just prior to using, in order to preserve its leafing qualities. This paint, therefore, is not formulated from a base, but is made up from the condensation derivative and solvents, and later powder, as follows:

| Material | Parts by weight | Pounds per gallon |
|---|---|---|
| Condensation derivative | 100 | 1.46 |
| Turpentine | 200 | 2.91 |
| Mineral spirits | 200 | 2.91 |
|  | 500 | 7.28 |

To this vehicle, aluminum powder, preferably 1.44 pounds per gallon, is added immediately before use.

Formula 8—White—For iron and steel

*Characteristics.*—Color—white. High gloss. Becomes gasoline resistant in two to three days if exposed to light. Not recommended for outdoor exposure.

*Application.*—For brush application, thinning is not required. For spray application, thin 10 to 20 percent with mineral spirits. This material sets to touch in about one hour and dries hard in 24 hours. Two coats are recommended allowing two hours between coats. Baking at 200 degrees F. for one hour greatly increases hardness.

| Material | Parts by weight | Pounds per gallon |
|---|---|---|
| Condensation derivative | 100 | 1.61 |
| Titanium dioxide | 150 | 2.42 |
| Zinc oxide | 25 | .40 |
| Raw tung oil | 5 | .08 |
| Mineral spirits | 300 | 4.85 |
|  | 580 | 9.36 |

| Material | Parts by weight | Pounds per gallon |
|---|---|---|
| | From bases | |
| Condensation derivative | 8.5 | .14 |
| Base A | 230.8 | 3.71 |
| Base C | 35.7 | .58 |
| Raw tung oil | 5.0 | .08 |
| Mineral spirits | 300.0 | 4.85 |
| | 580.0 | 9.36 |

*Formula 9—Brown air drying enamel*

*Characteristics.*—This material is formulated so as to resist 50% caustic at room temperature.

*Application.*—For brush application thinning is not required. For spray application, thin 10 to 20 percent with mineral spirits. Sets to touch in about one hour, but requires about 48 hours to dry hard. Two or three coats should be applied with a minimum amount of brushing, allowing two hours between coats. Films should be allowed to dry five days before subjecting to corrosion tests. This material is produced by mixing 200 parts of Formula 6 with 50 parts by weight of Formula 1.

*Formula 10—Red lead primer*

*Characteristics.*—Color—red. Good gloss; if this is objectionable it can be reduced by incorporating inerts such as whiting or diatomaceous silica. Excellent resistance to salt spray and combination of salt water immersion and weather exposure (alternate immersion and weather exposure tests). Fades on exposure to sunlight but does not chalk or check.

*Application.*—For brush application, thinning is not required. For spraying, this material should be thinned 10 percent with mineral spirits. This primer sets to touch in 1 to 1½ hours depending on temperature and humidity. When applied indoors at a temperature of 73 degrees Fahrenheit the solvent completely leaves the film in 16 hours. Oxidation then takes place and the film increases in weight for 7 days.

If the finish coat is sprayed on it can be applied over this primer in 24 hours, but if applied by brushing the primer should dry at least two days under average conditions. In cases where this drying time is prohibitive finish coats should be applied as soon as the primer has dried to touch. This material should be allowed to dry indoors for at least five days before being subjected to salt spray or other corrosion tests.

| Material | Parts by weight | Pounds per gallon |
|---|---|---|
| Condensation derivative | 100 | 1.57 |
| Red lead | 200 | 3.14 |
| Zinc oxide | 50 | .79 |
| Raw tung oil | 5 | .08 |
| Mineral spirits | 300 | 4.73 |
| | 655 | 10.31 |
| | From bases | |
| Base O | 350 | 5.50 |
| Raw tung oil | 5 | .08 |
| Mineral spirits | 300 | 4.73 |
| | 655 | 10.31 |

*Formula 11—Chromate primer*

*Characteristics.*—To be used on iron, steel, and non-ferrous alloys. Color—green. Medium gloss. Excellent resistance to moisture and salt spray. Especially recommended as a primer for non-ferrous alloys (dowmetal, duralumin, aluminum, zinc, etc.).

*Application.*—For brush application thinning is not required. When the paint is to be sprayed, it should be thinned 10 percent with mineral spirits. Finish coats should be applied within one hour after this primer has set to touch. If this cannot be done a drying period of 24 hours should be allowed before applying a finish by spraying, and 48 hours by brushing. This is to eliminate any possible tendency toward lifting.

| Material | Parts by weight | Pounds per gallon |
|---|---|---|
| Condensation derivative | 100 | 1.58 |
| Zinc chromate | 150 | 2.36 |
| Mineral spirits | 300 | 4.73 |
| Formula 1 | 13.25 | .21 |
| | 563.25 | 8.88 |
| | From bases | |
| Base F | 250 | 3.94 |
| Mineral spirits | 300 | 4.73 |
| Formula 1 | 13.25 | .21 |
| | 563.25 | 8.88 |

*Formula 12—Red baking primer—for iron and steel*

*Characteristics.*—Color — brick red. Slight gloss before baking; semi-flat after baking. Very good flexibility and adhesion to metal. Very resistant to salt spray.

*Application.*—For brush application, thinning is not required. For spraying, paint should be thinned 10 to 15 percent with mineral spirits.

This material dries very slowly and must be baked. It bakes quite hard in 20 minutes at 300 degrees Fahrenheit, but this can be increased to two hours without affecting the flexibility or adhesion.

| Material | Parts by weight | Pounds per gallon |
|---|---|---|
| Condensation derivative | 100 | 1.17 |
| Red iron oxide | 35.8 | .42 |
| Asbestine | 100 | 1.17 |
| Blanc fixe | 100 | 1.17 |
| Raw tung oil | 50 | .58 |
| Mineral spirits | 400 | 4.66 |
| | 785.8 | 9.17 |
| | From bases | |
| Base D | 59.7 | .70 |
| Base G | 142.8 | 1.68 |
| Base M | 133.3 | 1.55 |
| Raw tung oil | 50.0 | .58 |
| Mineral spirits | 400.0 | 4.66 |
| | 785.8 | 9.17 |

*Formula 13—Red baking primer—for iron and steel*

*Characteristics.*—Color—dark brick red. Semi-flat after baking. Excellent resistance to salt spray. Especially designed for automotive work.

*Application.*—For spray application only. Does not require thinning. Spray one heavy coat, air dry not more than 15 minutes, then bake 45 minutes at 300 degrees F. for use under air drying finishes, or 30 minutes at 300 degrees F. for use under baking finishes.

For best results an electric or steam heated oven should be used, as gas fired ovens frequently cause wrinkling.

| Material | Parts by weight | Pounds per gallon |
|---|---|---|
| Condensation derivative | 100 | 1.05 |
| Iron oxide | 50 | .525 |
| Zinc chromate | 50 | .525 |
| Superfloss silica | 100 | 1.05 |
| Raw tung oil | 50 | .525 |
| Boiled linseed oil | 50 | .525 |
| Formula 1 | 40 | .42 |
| Mineral spirits | 400 | 4.21 |
|  | 840 | 8.83 |
| From bases | | |
| Base D | 83.3 | .875 |
| Base F | 83.3 | .875 |
| Base H | 111.0 | 1.17 |
| Superfloss silica | 22.4 | .23 |
| Raw tung oil | 50.0 | .525 |
| Boiled linseed oil | 50.0 | .525 |
| Formula 1 | 40.0 | .42 |
| Mineral spirits | 400.0 | 4.21 |
|  | 840.0 | 8.83 |

In the case of the latter formula, the superfloss silica is added in part as such rather than entirely as Base H to produce a flat finish.

*Formula 14—Yellow baking primer*

*Characteristics.*— This primer is employed where a lighter colored material than Formula 13 dark red primer is required. Has excellent resistance to salt spray and numerous tests have shown it to be highly resistant to humidity.

*Application.*—For spraying only. Does not require thinning. Spray one mist coat, air-dry five minutes, then spray one wet coat and bake 30–45 minutes at 300 degrees F.

| Material | Parts by weight | Pounds per gallon |
|---|---|---|
| Condensation derivative | 100 | 1.07 |
| Zinc chromate | 50 | .535 |
| Titanium dioxide | 31 | .33 |
| Yellow iron oxide | 50 | .535 |
| Superfloss silica | 63 | .68 |
| Raw tung oil | 50 | .535 |
| Boiled linseed oil | 50 | .535 |
| Mineral spirits | 400 | 4.30 |
|  | 794 | 8.52 |
| From bases | | |
| Base A | 48 | .51 |
| Base F | 83 | .89 |
| Base Q | 83 | .89 |
| Base H | 57 | .61 |
| Superfloss silica | 23 | .25 |
| Raw tung oil | 50 | .535 |
| Boiled linseed oil | 50 | .535 |
| Mineral spirits | 400 | 4.30 |
|  | 794 | 8.52 |

The 23 parts of superfloss added as such to the latter formulation, is incorporated in this way rather than entirely as Base H to produce a flat finish.

*Formula 15—Black baking primer*

*Characteristics.*—Color—black. Satin finish. Formulated to be rust inhibitive.

*Application.*—This material is of spraying consistency. Spray one mist coat, air-dry five minutes, spray one wet coat, air-dry five minutes and bake for 40 minutes at 300 degrees F.

| Material | Parts by weight | Pounds per gallon |
|---|---|---|
| Condensation derivative | 100 | .84 |
| Black iron oxide | 50 | .42 |
| Zinc chromate | 50 | .42 |
| Superfloss silica | 77 | .65 |
| Formula 1 | 200 | 1.70 |
| Raw tung oil | 50 | .42 |
| Boiled linseed oil | 50 | .42 |
| Mineral spirits | 300 | 2.54 |
| Toluol | 100 | .84 |
|  | 977 | 8.25 |
| From Bases | | |
| Condensation derivative | .4 |  |
| Black iron oxide base | 83.3 | .70 |
| Base F | 83.3 | .70 |
| Superfloss Base H | 110.0 | .93 |
| Formula 1 | 200.0 | 1.70 |
| Raw tung oil | 50.0 | .42 |
| Boiled linseed oil | 50.0 | .42 |
| Mineral Spirits | 300.0 | 2.54 |
| Toluol | 100.0 | .84 |
|  | 977.0 | 8.25 |

Concrete coatings made from the condensation derivative are outstanding because of their good adhesion, resistance to moisture penetration, and ability to withstand the effect of alkalies, both from the concrete and from alkaline cleansing agents. Their abrasion resistance is excellent, and these coatings offer a means of solving the problem of a satisfactory concrete floor covering. These finishes are also adaptable to walls, either plaster, concrete, or masonry. Formulæ 16 to 20 are designed particularly for such use. In applying these compositions to a floor, for example, the floor must be clean and free from grease. Ordinary washing with gasoline does not sufficiently remove the grease, but merely drives it into the pores of the concrete where the paint should adhere. Therefore, it is suggested that the floor be cleaned by one of the following methods:

1. A cleaning fluid made by using 1½ ounces of tri-sodium phosphate (Oakite* and 1½ ounces of soap chips per gallon of water).
2. By using Wyandotte Cleaner #3 as recommended by the manufacturer. (This can be purchased from any reputable paint supply house.)

The floor should then be thoroughly cleaned and rinsed with clear water. In addition to this precaution, where especially greasy spots have been, or where the cement is glassy smooth, it is recommended that these places be etched with a 10% solution of muriatic acid. This etching is carried out by pouring the acid of the right concentration on the floor and allowing it to remain until it ceases to effervesce. The acid is then washed free and the floor allowed to dry. It is then ready for application of the first coat of paint.

The first coat should be applied after being thinned at least 25% with mineral spirits. This is done in order to cut down the viscosity of the paint and allow the first coat to thoroughly penetrate into the concrete. Subsequent coats are then applied at intervals of approximately two hours or longer. Another precaution which has been found quite desirable is that the traffic lanes in an office, for example, be given more than two coats of the material. This is done by painting the lanes two or three coats before the final coat is applied to the entire floor. It is possible to deposit only a certain thickness of film per coat of material and if this thickness is increased the wear on the floor will be longer. These concrete paints dry to touch in approximately one hour's time and the floor can be subjected to light traffic in two to six hours after application. However, the adhesion of the film to the concrete does not develop to its maximum until a period of two to five days has elapsed. This means that heavy traffic should not be put on the floor until the coating has reached its maximum adhesion.

*Formula 16—Gray—For concrete, iron, and steel*

*Characteristics.* — Color — blue gray. Good gloss. Becomes gasoline resistant in about three weeks if exposed to light. Gave very good results on concrete floor. Not recommended for exterior work.

*Application.*—For brush application, thinning is not required. For spray application, thin 10 to 20 percent with mineral spirits (about one pint per gallon). This material sets to touch in about one hour and dries hard in 24 hours. Two coats are recommended allowing at least two hours between coats. On concrete floors this material should be allowed to dry three to four days before being subjected to severe service.

| Material | Parts by weight | Pounds per gallon |
|---|---|---|
| Condensation derivative | 100.00 | 1.69 |
| Titanium dioxide | 41.30 | .70 |
| Zinc oxide | 41.30 | .70 |
| Carbon black | 3.17 | .05 |
| Prussian blue | 1.44 | .02 |
| Raw tung oil | 5.00 | .08 |
| Mineral spirits | 300.00 | 5.06 |
| | 492.21 | 8.30 |
| From bases | | |
| Condensation derivative | 45.08 | .76 |
| Base A | 63.60 | 1.07 |
| Base C | 59.00 | 1.00 |
| Base B | 13.77 | .23 |
| Base K | 5.76 | .10 |
| Raw tung oil | 5.00 | .08 |
| Mineral spirits | 300.00 | 5.06 |
| | 492.21 | 8.30 |

*Formula 17—White—For concrete, iron and steel*

*Characteristics.*—Color—white, but can be tinted to match any light color. High gloss. Dries gasoline resistant in 24 hours. Resistant to acids and alkalies. Not for outdoor exposure.

*Application.*—For brush application, thinning is not required. For spraying, this material should be thinned 10 to 15 percent with mineral spirits. Sets to touch in about one hour and dries hard in 24 hours. Two coats should be applied; the second coat about one hour after the first coat has set to touch.

| Material | Parts by weight | Pounds per gallon |
|---|---|---|
| Condensation derivative | 100 | 1.73 |
| Titanium dioxide | 100 | 1.73 |
| Superfloss silica | 100 | 1.73 |
| Raw tung oil | 5 | .09 |
| Mineral spirits | 250 | 4.30 |
| | 555 | 9.58 |
| From bases | | |
| Condensation derivative | 3 | .05 |
| Base A | 154 | 2.66 |
| Base H | 143 | 2.48 |
| Raw tung oil | 5 | .09 |
| Mineral spirits | 250 | 4.30 |
| | 555 | 9.58 |

*Formula 18.—Gray—For concrete, iron, and steel*

*Characteristics.* — Color — dark gray. High gloss. Becomes gasoline resistant in about 4 days. Not recommended for outdoor exposure.

*Application.*—For brush application, thinning is not required. For spray application this paint should be thinned 10 to 15 percent with mineral spirits. Sets to touch in about 1 hour and dries hard in 24 hours. Two coats are recommended, allowing about 4 hours between coats. When applied to concrete floors this material should be allowed to harden from four to five days before being subjected to severe service.

| Material | Parts by weight | Pounds per gallon |
|---|---|---|
| Condensation derivative | 100 | 1.75 |
| Titanium dioxide | 79 | 1.38 |
| Superfloss silica | 100 | 1.75 |
| Carbon black | 3 | .05 |
| Prussian blue | 1.5 | .03 |
| Raw tung oil | 5 | .09 |
| Mineral spirits | 250 | 4.35 |
| | 538.5 | 9.40 |
| From bases | | |
| Base A | 121.5 | 2.12 |
| Base H | 143.0 | 2.51 |
| Base B | 13.0 | .23 |
| Base K | 6.0 | .10 |
| Raw tung oil | 5.0 | .09 |
| Mineral spirits | 250.0 | 4.35 |
| | 538.5 | 9.40 |

*Formula 19—Olive gray concrete*

*Characteristics.*—This material does not dry gasoline resistant. When resistance to gasoline is required paint must be specially formulated. Withstands moisture penetration and the effect of alkalies, both from the concrete and from alkaline cleaning agents.

*Application.*—Allow about two hours between coats, or just enough time for the previous coat to dry to touch. Spray application is not recommended on concrete floors.

Parts by weight
Formula 17 _____ 630.0
Formula 1 _____ 16.3
Base P solution _____ 97.0

Base P solution is composed of 50 parts by weight of Base P and 50 parts by weight of mineral spirits.

*Formula 20—Gray—For concrete, iron and steel*

*Characteristics.*—Color—gray. High gloss. Becomes gasoline resistant in about 4 days. Not recommended for outdoor exposure.

*Application.*—For brush application thinning is not required. For spray application this paint should be thinned 10 to 15 percent with mineral spirits. Sets to touch in about 1 hour and dries hard in 24 hours. Two coats are recommended, allowing about 4 hours between coats. When applied to concrete floors this material should be allowed to harden from four to five days before being subjected to severe service.

| Material | Parts by weight | Pounds per gallon |
|---|---|---|
| Condensation derivative | 100.0 | 1.755 |
| Carbon black | 2.25 | .040 |
| Titanium dioxide | 92.80 | 1.628 |
| Superfloss silica | 92.80 | 1.628 |
| Raw tung oil | 5.00 | .037 |
| Mineral spirits | 254.50 | 4.462 |
| | 547.35 | 9.600 |

| Material | Parts by weight | Pounds per gallon |
|---|---|---|
| *From bases* | | |
| Condensation derivative | 2.75 | .048 |
| Base A | 143.00 | 2.505 |
| Base B | 9.80 | .172 |
| Base H | 132.30 | 2.326 |
| Raw tung oil | 5.00 | .087 |
| Mineral spirits | 254.50 | 4.462 |
| | 547.35 | 9.600 |

The hardness, flexibility, and adhesion of baking finishes formulated with the condensation derivative and mixtures of drying oils, together with their resistance to moisture and chemicals, offer a promising field in industrial applications. Formulae 21–24 should be considered especially in connection with sheet metal coating, where the metal is subsequently to be drawn or pressed into shape.

*Formula 21—Red brown baking enamel*

Characteristics.—Glossy. Rust inhibitive. Does not require a primer. For spray application only.

Application.—Spray one heavy coat, air-dry not more than five minutes, and bake 20 minutes at 300 degrees F.

| Materials | Parts by weight | Pounds per gallon |
|---|---|---|
| Condensation derivative | 100.0 | 1.10 |
| Red iron oxide | 75.0 | .83 |
| Zinc chromate | 75.0 | .83 |
| Boiled linseed oil | 62.5 | .70 |
| Raw tung oil | 43.8 | .49 |
| 20% sol. Pb-Mn drier | 18.7 | .21 |
| Mineral spirits | 375.0 | 4.17 |
| | 750.0 | 8.33 |
| *From bases* | | |
| Base D | 125.0 | 1.39 |
| Base F | 125.0 | 1.39 |
| Boiled linseed oil | 62.5 | .70 |
| Raw tung oil | 43.8 | .49 |
| 20% sol. Pb-Mn drier | 18.7 | .21 |
| Mineral spirits | 375.0 | 4.15 |
| | 750.0 | 8.33 |

*Formula 22—Brown baking enamel*

Characteristics.—Glossy. Passes salt spray test, but is not rust inhibitive. For spray application only.

Application.—Spray one heavy coat, air-dry not more than five minutes, and bake 20 minutes at 300 degrees F., or longer if greater hardness is desired.

| Material | Parts by weight | Pounds per gallon |
|---|---|---|
| Condensation derivative | 100.0 | 1.30 |
| Yellow iron oxide | 82.5 | 1.08 |
| Red iron oxide | 29.7 | .39 |
| Carbon black | 6.9 | .09 |
| 10% solution lead Soligen drier | 5.0 | .06 |
| 10% solution manganese Soligen drier | 15.0 | .20 |
| Boiled linseed oil | 85.0 | 1.11 |
| Raw tung oil | 30.0 | .39 |
| Mineral spirits | 300.0 | 3.90 |
| | 654.1 | 8.52 |
| *From bases* | | |
| Condensation derivative | 2.1 | .03 |
| Base A | 137.5 | 1.80 |
| Base D | 49.5 | .64 |
| Base B | 30.0 | .39 |
| 10% sol. lead Soligen drier | 5.0 | .06 |
| 10% sol. manganese Soligen drier | 15.0 | .20 |
| Boiled linseed oil | 85.0 | 1.11 |
| Raw tung oil | 30.0 | .39 |
| Mineral spirits | 300.0 | 3.90 |
| | 654.1 | 8.52 |

*Formula 23—Brown baking enamel*

Characteristics.—Developed primarily for beer barrels. Passes salt spray test satisfactorily, but is not rust inhibitive. Spray application only.

Application.—Spray one heavy coat. Bake 45 minutes at 240 degrees F. or 30 minutes at 300 degrees F.

| Material | Parts by weight | Pounds per gallon |
|---|---|---|
| Condensation derivative | 100.0 | 1.31 |
| Brown iron oxide | 87.0 | 1.14 |
| Superfloss silica | 22.0 | .29 |
| Carbon black | 4.0 | .05 |
| Boiled linseed oil | 56.5 | .74 |
| Raw tung oil | 31.0 | .40 |
| 10% solution Pb-Mn Soligen drier | 26.0 | .34 |
| Mineral spirits | 300.0 | 3.93 |
| | 626.5 | 8.20 |
| *From bases* | | |
| Base R | 174.0 | 2.28 |
| Superfloss silica* | 22.0 | .29 |
| Base B | 17.0 | .22 |
| Boiled linseed oil | 56.5 | .74 |
| Raw tung oil | 31.0 | .40 |
| 10% solution Pb-Mn Soligen drier | 26.0 | .34 |
| Mineral spirits | 300.0 | 3.93 |
| | 626.5 | 8.20 |

*The superfloss silica in this material is incorporated in a paint mill and not as Base H (70% superfloss silica—30% condensation derivative) in order to produce flatness.

*Formula 24—Black baking metal enamel*

Characteristics.—Glossy. Passes salt spray test. For spray application only.

Application.—For a one-coat job, bake immediately after application for 20 minutes at 300 degrees F. For a two-coat job, air-dry 10 minutes between coats, then bake 30 minutes at 300 degrees F.

| Material | Parts by weight | Pounds per gallon |
|---|---|---|
| Condensation derivative | 100 | 1.25 |
| Carbon black | 30 | .38 |
| Raw tung oil | 25 | .31 |
| Boiled linseed oil | 25 | .31 |
| Pb-Mn Soligen drier | 2.25 | .03 |
| Mineral spirits | 400 | 5.02 |
| | 582.25 | 7.30 |
| *From bases* | | |
| Base B | 130 | 1.63 |
| Raw tung oil | 25 | .31 |
| Boiled linseed oil | 25 | .31 |
| Pb-Mn Soligen drier | 2.25 | .03 |
| Mineral spirits | 400 | 5.02 |
| | 582.25 | 7.30 |

*Formula 25—Semi-flat white maintenance paint*

Characteristics.—Light and pastel shades may readily be made from this material by tinting. It has shown very good resistance to water, soaps, and alkaline cleaning agents.

Application.—For brush application, thinning is not required. For spray application, thin 10 to 20 percent with mineral spirits. When two coats are necessary apply the second about one hour after the first has set to touch. If this cannot be done a drying period of 24 hours should be allowed before spraying, or 48 hours before brushing on the second coat.

| Material | Parts by weight | Pounds per gallon |
|---|---|---|
| Condensation derivative | 100 | 1.58 |
| Titanium dioxide | 150 | 2.37 |
| Superfloss silica | 25 | .40 |
| Zinc oxide | 25 | .40 |
| Raw tung oil | 5 | .08 |
| Mineral spirits | 300 | 4.74 |
|  | 605 | 9.57 |
| From bases |  |  |
| Condensation derivative | 8.3 | .13 |
| Base A | 231.0 | 3.66 |
| Superfloss silica* | 25.0 | .40 |
| Base C | 35.7 | .56 |
| Raw tung oil | 5.0 | .08 |
| Mineral spirits | 300.0 | 4.74 |
|  | 605.0 | 9.57 |

*The superfloss silica in this material is incorporated in a paint mill and not as Base H (70% superfloss silica—30% condensation derivative) in order to produce flatness.

*Formula 26—Gloss white maintenance paint*

*Characteristics.*—Light and pastel shades may readily be made from this material by tinting. It shows very good resistance to water, soaps, and alkaline cleaning agents.

*Application.*—For brush application, thinning is not required. For spray application, thin 10 to 20 percent with mineral spirits. When two coats are necessary apply the second about one hour after the first has set to touch. If this cannot be done a drying period of 24 hours should be allowed before spraying, or 48 hours before brushing on the second coat.

| Material | Parts by weight | Pounds per gallon |
|---|---|---|
| Condensation derivative | 100 | 1.54 |
| Titanium dioxide | 150 | 2.30 |
| Zinc oxide | 25 | .38 |
| Raw tung oil | 5 | .08 |
| Boiled linseed oil | 25 | .38 |
| Mineral spirits | 300 | 4.62 |
|  | 605 | 9.30 |
| From bases |  |  |
| Condensation derivative | 8.3 | .13 |
| Base A | 231.0 | 3.54 |
| Base C | 35.7 | .55 |
| Raw tung oil | 5.0 | .08 |
| Boiled linseed oil | 25.0 | .38 |
| Mineral spirits | 300.0 | 4.62 |
|  | 605.0 | 9.30 |

*Formula 27—Flat white maintenance paint*

*Characteristics.*—Light and pastel shades may readily be made from this material by tinting. It shows very good resistance to water, soaps, and alkaline cleaning agents.

*Application.*—For brush application, thinning is not required. For spray application, thin 10 to 20 percent with mineral spirits. When two coats are necessary apply the second about one hour after the first has set to touch. If this cannot be done a drying period of 24 hours should be allowed before spraying, or 48 hours before brushing on the second coat.

| Material | Parts by weight | Pounds per gallon |
|---|---|---|
| Condensation derivative | 100 | 1.55 |
| Titanium dioxide | 150 | 2.32 |
| Superfloss silica | 50 | .77 |
| Zinc oxide | 25 | .39 |
| Raw tung oil | 5 | .08 |
| Mineral spirits | 300 | 4.65 |
|  | 630 | 9.76 |
| From bases |  |  |
| Condensation derivative | 8.6 | 1.13 |
| Base A | 230.7 | 3.58 |
| Base C | 35.7 | .55 |
| Superfloss silica * | 50.0 | .77 |
| Raw tung oil | 5.0 | .08 |
| Mineral spirits | 300.0 | 4.65 |
|  | 630.0 | 9.76 |

* The superfloss silica in this mixture, is incorporated on a paint mill for flatness, and not as a base.

*Formula 28—Green air drying wood enamel*

*Characteristics.*—Glossy—can easily be altered to give satin or flat finish. Shows imperviousness to water and ability to withstand alkaline cleaners and soaps.

*Application.*—For brush application, thinning is not required. For spray application, thin 10 to 20 percent with mineral spirits. When two coats are necessary apply the second about one hour after the first has set to touch. If this cannot be done a drying period of 24 hours should be allowed before spraying, or 48 hours before brushing on the second coat. Wood not previously painted should be primed with white lead in oil.

| Material | Parts by weight | Pounds per gallon |
|---|---|---|
| Condensation derivative | 100 | 1.30 |
| Titanium dioxide | 160 | 2.08 |
| Zinc oxide | 31.5 | .41 |
| Base F solution | 70.0 | .91 |
| Glen green solution | 35.0 | .45 |
| 4-hour linseed oil | 35.0 | .45 |
| Mineral spirits | 275.0 | 3.58 |
|  | 706.5 | 9.18 |
| From bases |  |  |
| Condensation derivative | .5 | |
| Base A | 246.0 | 3.20 |
| Base C | 45.0 | .59 |
| Base F solution | 70.0 | .91 |
| Glen green solution | 35.0 | .45 |
| 4-hour linseed oil | 35.0 | .45 |
| Mineral spirits | 275.0 | 3.58 |
|  | 706.5 | 9.18 |

The above mentioned solution of Base F is composed of 250 parts by weight of Base F and 300 mineral spirits. The Glen green solution is made up of 100 parts by weight of condensation derivative, 30 parts Glen green, and 225 parts mineral spirits.

*Formula 29—Glossy white wood enamel*

*Characteristics.*—This material is resistant to water penetration, and to the effect of soaps and alkaline cleaning agents.

*Application.*—Wood that has not been previously painted should be primed with white lead in oil. If a second coat is necessary this must be applied as soon as the first coat has set to touch. If this cannot be done allow the first coat to dry 24 hours before applying the second. If thinning becomes necessary use pure spirits of turpentine.

| Material | Parts by weight | Pounds per gallon |
|---|---|---|
| Condensation derivative | 100.0 | 1.67 |
| Titanium dioxide | 160.0 | 2.68 |
| Zinc oxide | 31.5 | .53 |
| 4-hour linseed oil | 35.0 | .58 |
| Mineral spirits | 250.0 | 4.19 |
| | 576.5 | 9.65 |
| From bases | | |
| Condensation derivative | .5 | |
| Base A | 246.0 | 4.12 |
| Base C | 45.0 | .76 |
| 4-hour linseed oil | 35.0 | .58 |
| Mineral spirits | 250.0 | 4.19 |
| | 576.5 | 9.65 |

*Formula 30—Glossy yellow wood enamel*

Characteristics and application same as for Formula 29.

| Material | Parts by weight | Pounds per gallon |
|---|---|---|
| Condensation derivative | 100.0 | 1.58 |
| Titanium dioxide | 144.0 | 2.27 |
| Zinc oxide | 28.5 | .45 |
| Zinc chromate | 11.0 | .17 |
| Yellow iron oxide | 3.5 | .05 |
| 4-hour linseed oil | 31.5 | .50 |
| Mineral spirits | 277.5 | 4.38 |
| | 596.0 | 9.40 |
| From bases | | |
| Condensation derivative | .7 | |
| Base A | 221.5 | 3.50 |
| Base C | 40.7 | .64 |
| Base F | 18.3 | .29 |
| Base P | 5.8 | .09 |
| 4-hour linseed oil | 31.5 | .50 |
| Mineral spirits | 277.5 | 4.38 |
| | 596.0 | 9.40 |

*Formula 31—Glossy dark gray wood enamel*

Characteristics and application same as for Formula 29.

| Material | Parts by weight | Pounds per gallon |
|---|---|---|
| Condensation derivative | 100.0 | 1.55 |
| Titanium dioxide | 87.0 | 1.34 |
| Zinc oxide | 14.5 | .22 |
| Carbon black | 12.5 | .19 |
| Raw tung oil | 5.0 | .08 |
| 4-hour linseed oil | 23.5 | .36 |
| Mineral spirits | 300.0 | 4.65 |
| | 542.5 | 8.39 |
| From bases | | |
| Condensation derivative | 5.0 | .08 |
| Base A | 134.0 | 2.06 |
| Base C | 20.5 | .32 |
| Base B | 54.5 | .84 |
| Raw tung oil | 5.0 | .08 |
| 4-hour linseed oil | 23.5 | .36 |
| Mineral spirits | 300.0 | 4.65 |
| | 542.5 | 8.39 |

*Formula 32—Glossy dark blue wood enamel*

Characteristics and application same as for Formula 29.

| Material | Parts by weight | Pounds per gallon |
|---|---|---|
| Condensation derivative | 100.0 | 1.90 |
| Prussian blue | 29.5 | .56 |
| Titanium dioxide | 9.5 | .18 |
| Zinc oxide | 1.5 | .03 |
| Carbon black | 1.5 | .03 |
| Raw tung oil | .75 | .01 |
| 4-hour linseed oil | 21.5 | .41 |
| Mineral spirits | 324.5 | 4.46 |
| | 398.75 | 7.58 |
| From bases | | |
| Condensation derivative | 1.0 | .02 |
| Base K | 118.0 | 2.24 |
| Base A | 14.5 | .28 |
| Base C | 2.0 | .04 |
| Base B | 6.5 | .12 |
| Raw tung oil | .75 | .01 |
| 4-hour linseed oil | 21.5 | .41 |
| Mineral spirits | 234.5 | 4.46 |
| | 398.75 | 7.58 |

The bases referred to in the above formulae are prepared by milling together the ingredients specified below on a rubber mill.

| Base No. | Rubber cond. derivative percent | Pigment or filler | Specific gravity |
|---|---|---|---|
| A | 35 | 65% Titanium oxide | 2.03 |
| B | 77 | 23% Carbon black | 1.17 |
| C | 30 | 70% XX50 zinc oxide | 2.45 |
| D | 40 | 60% Red iron oxide | 1.96 |
| E | 40 | 60% Indian red iron oxide | 2.00 |
| F | 40 | 60% Zinc chromate | 1.78 |
| G | 30 | 70% Asbestine | 1.88 |
| H | 30 | 70% Silica (super floss) | 1.69 |
| I | 50 | 50% China clay | 1.51 |
| J | 30 | 70% Chrome green (oxide) | 2.38 |
| K | 75 | 25% Prussian blue | 1.19 |
| L | 35 | 65% Titanox "C" | 1.89 |
| M | 25 | 75% Blanc fixe | 2.45 |
| N | 52.6 | 15.8% Carbon black: 31.6 china clay. | 1.41 |
| O | 28.5 | 57.2% Red lead: 14.3% Zinc oxide. | 2.79 |
| P | 40 | 60% Yellow iron oxide | 1.94 |
| Q | 40 | 60% Yellow iron oxide—light | 1.89 |
| R | 50 | 50% Brown iron oxide | 1.72 |

*a—Water immersion.*—Each of the Formulae 1 to 9 has been tested for moisture penetration and their high resistance to moisture penetration is illustrated by the following:

1. Galvanized iron coated with Formula 1 Black has been immersed in water continuously for one year without any effect on the film.
2. Galvanized iron coated with Formula 10—Red lead primer has been immersed in water continously for 8 months without any effect on the film.
3. Black iron panels coated with Formula 2—Acid and alkali resistant black have been immersed in water 2 months without any effect on the film.
4. Iron racks coated with Formula 10 Primer, Formula 1 Black and Formula 16 Gray have been subjected repeatedly to the action of open steam at 285° F. without any effect.
5. Water has been boiled for 8 hours in a steel crucible coated with a baked finish. After the test the film was still in excellent condition.

*b—Salt water immersion.*—Numerous coated panels were subjected to the alternate immersion test. In this test the panels were immersed in a 5% solution of sodium chloride at night and exposed to the sun (45° facing south) in the daytime. Compositions containing high properties of pigment gave the best results in this test. Several nitro-cellulose and phthalic-anhydride-glycerol lacquers, oil paints and asphalt paints were also subjected to this test. All showed definite corrosion after two months.

A panel covered with one coat of Formula 10 Primer and two coats of Formula 7 Aluminum were in excellent condition after five months of exposure. Panels, similarly coated were immersed in Lake Erie water at Lorain Harbor. The film was still perfect upon removal of the panels after six months immersion.

*c—Salt spray.*—Several hundred panels have been tested by salt spray. In each case three coats of the condensation derivative were applied directly to sand-blasted black iron (unprimed). Results:

1. Oil paints, except those containing large amounts of red lead, zinc chromate or aluminum powder, fail by blistering and corrosion in 200 hours or less.
2. Nitrocellulose lacquers fail by corrosion in four to five days.
3. Phthalic-anhydride-glycerol lacquers usually do not show appreciable corrosion in 200 hours, but they lose adhesion and become brittle.
4. Coating compositions of this invention, clear or any color, pass the 200 hour salt spray test in perfect condition. Formulas 2, 10 and 12 have successfully stood this test 30 to 60 days.

COMPARATIVE RATING

*Water Immersion—Salt water—Salt spray tests*

|  | Water immersion | Salt-water immersion | Salt-spray |
| --- | --- | --- | --- |
| Coating compositions of this invention. | Good | Good | Very good |
| Oil paints | Fair | Poor | Poor |
| Nitrocellulose lacquer | Poor—Fair | Poor | Very poor |
| Black baked lacquer | Poor | Poor—Fair | Fair—Good |
| Air dried clear lacquer | Poor | Poor—Fair | Fair |
| Chlorinated rubber | Good | Fair | Poor—Fair |
| Commercial 4-hour enamel. | Fair | Poor | Poor |

*d—Chemical resistance tests.*—All coating compositions of this invention, both clear and pigmented, are unusually resistant to chemical attack. Formula 2 Black has been particularly designed for this service, however, and is recommended where conditions are unusually severe. This will resist concentrated hydrochloric and nitric acids; sulphuric acid up to 50% concentration and alkalies of any concentration. Formulae 3, 4, 5 and 9 have been developed for caustic immersion, such as for the lining of caustic tank cars, and have been used with excellent results. The following tests have been conducted on iron panels coated with Formula 2.

*Acid tests*

1. Several drops of concentrated hydrochloric acid were applied and allowed to evaporate at room temperature with no effect on the film. Iron panels, brush coated, immersed in 5%, 10%, 20% and 30% hydrochloric acid at room temperature, showed no indication of failure after 718 hours.
2. Several drops of concentrated nitric acid were applied and allowed to evaporate without effect.
3. Panels immersed in 1:1 sulphuric acid for two weeks showed no failure. Iron panels, brushed coated with this Formula 2, and immersed in 5%, 10%, 20% and 30% sulphuric acid at room temperature showed no indication of failure after 716 hours.

*Alkali tests*

4. Panels immersed in 50% sodium hydroxide for 120 days showed no effects. Iron panels brush coated with this Formula 2 and immersed in 5%, 10%, 20% and 30% sodium hydroxide showed no indication of failure after 712 hours.

*Comparative rating of mechanical properties*

|  | Adhesion to metal | Flexibility | Resistance to impact | Resistance to chipping |
| --- | --- | --- | --- | --- |
| Coating compositions of this invention. | Good | Very good | Good | Good |
| Oil paint | Poor | Very poor | Poor | Poor |
| Nitrocellulose lacquer. | Very poor | Very poor | Poor | Poor |
| Black baked lacquer. | Good | Good | Good | Fair |
| Air-dried clear laquer. | Good | Fair | Poor | Very poor |
| Chlorinated rubber. | Very poor | Very poor | Poor | Very poor |
| Commercial 4-hour enamel. | Poor | Poor | Poor | Poor—fair |

*Drying time*

One of the characteristic properties of the paints of this invention is the rapid drying qualities. The following table shows the comparative drying rate of these and other commonly used finishes.

*Drying time in air*

|  | To touch | To recoat | For service |
| --- | --- | --- | --- |
| Coating compositions of this invention. | 1 hour | 2–4 hours | 24–48 hours |
| Oil paint | 24–36 hours | 24 hours or more | 2–5 days |
| Nitrocellulose lacquer | 5–15 min. | 15 minutes | 24 hours |
| Black baked lacquer | .5–1.5 hours | .5–1.5 hours | After baking |
| Air-dried clear lacquer. | .5 hour | 2 hours | 8 hours |
| Clear varnish | 6–8 hours | 24 hours | 2–5 days |
| Chlorinated rubber | 30 minutes | 30 minutes | 1 hour |
| Commercial 4-hour enamel. | 1.5 hours | 4 hours | 24 hours |

Coating compositions of this invention can be extensively used as a primer and undercoating. The rapid drying quality, excellent adhesion and resistance to moisture meet the needs of a primer most successfully. No trouble has been experienced in applying any other types of paint, enamel or lacquer as finishing coats over them. For metal protection they have the distinct advantage of drying rapidly to form a hard film which resists scraping and abrasive wear most effectively. They also stand up much more satisfactorily under moisture and salt-spray conditions. Their attractive appearance, resistance to alkalies, acids, oils and gasoline give them excellent properties for the original and maintenance coats on all forms of machinery. Since limited amounts of them can be advantageously blended with linseed oil paints, more rapidly drying wood paints having improved resistance to moisture can be secured at a small additional cost. On concrete and plaster they give improved adhesion, resistance to abrasive wear, greater moisture resistance and more rapid drying. For automotive work, they provide an excellent primer base. The improved adhesion, more effective resistance to moisture and more flexible film provide a hard, firm base for subsequent finishing coats. Due to their acid and alkali resistant qualities, they provide the ideal paint for equipment for chemical plants and the like. They withstand caustic immersion for prolonged intervals, are recommended for casual contact with acids, and are resistant to a great many severe conditions. Cold cut and blended with oils, they give tough, adhesive films with high resistance to humidity which make them excellent processing enamels.

The preferred compound recommended for use in the above formulae is the chlorine-containing rubber condensation derivative, the preparation of which is described above. Other condensation derivatives of rubber may be used. They may be substantially halogen-free, as for example, products made by the condensation of rubber with halides of amphoteric metals, such as tin tetrachloride, chromic chloride, etc. Condensation derivatives which are soluble (dispersible) in the cheap petroleum distillates have a distinct commercial advantage and are therefore generally preferred. By employing a substantially unoxidized derivative as herein disclosed a film is produced which oxidizes on exposure to air and by using a suitable vehicle a coating is produced which on exposure to the air becomes insoluble in the vehicle.

The preparation of condensation derivatives of rubber is covered in the following copending applications:

Sebrell, Ser. No. 654,248, filed January 30, 1933; Kurtz, Ser. No. 680,982, filed July 18, 1933; Thies & Lyon, Ser. No. 699,634, filed November 24, 1933; Sebrell, Ser. No. 718,215, filed March 30, 1934; Wright, Ser. No. 718,686, filed April 2, 1934.

I claim:

1. A coating composition which comprises (a) liquid vehicle composed in substantial part of volatile petroleum distillate and (b) dispersed therein a substantially unoxidized condensation derivative of rubber which condensation derivative of rubber (1) is substantially identical with the product of a process of making in which oxygen is substantially excluded and contains substantially no oxidized material, (2) is readily oxidizable to a product which is insoluble in said vehicle and (3) is dissolved and completely dispersed in said vehicle.

2. A coating composition which comprises (a) liquid vehicle composed in substantial part of volatile petroleum distillate and (b) dispersed therein a substantially unoxidized condensation derivative of rubber which condensation derivative of rubber (1) is substantially identical with the product of a process of making in which oxygen is substantially excluded and contains substantially no oxidized material, (2) is no darker than light amber in color in granular form and is substantially clear and colorless in films 25–30 microns in thickness, (3) liquefies at a temperature above 150° C., (4) is readily oxidizable to a product which is insoluble in said vehicle and (5) is dissolved and completely dispersed in said vehicle.

3. A coating composition which comprises (a) liquid vehicle composed in substantial part of volatile petroleum distillate and (b) dispersed therein a substantially unoxidized condensation derivative of rubber which condensation derivative of rubber (1) is obtainable by decomposition with water of a conversion product obtainable by the treatment of rubber in solution with chlorostannic acid, (2) is no darker than light amber in color in granular form and is substantially clear and colorless in films 25 to 30 microns in thickness, (3) is readily oxidizable to a product which is insoluble in said vehicle, (4) is present in the coating composition in a state in which it is substantially free from water-soluble impurities and (5) is dissolved and completely dispersed in said vehicle.

4. An article comprising wood, metal, plaster, concrete or masonry coated with a film formed from the coating composition of claim 1.

5. An article comprising wood, metal, plaster, concrete or masonry coated with a film formed from the coating composition of claim 2.

6. An article comprising wood, metal, plaster, concrete or masonry coated with a film formed from the coating composition of claim 3.

7. A coating composition which comprises petroleum distillate and a substantially unoxidized condensation derivative of rubber which is substantially identical with the product of a process of making in which oxygen is substantially excluded and contains substantially no oxidized material, the petroleum distillate being the only readily volatile solvent therein.

8. A coating composition which comprises an acidic pigment, petroleum distillate and a substantially unoxidized condensation derivative of rubber which is substantially identical with the product of a process of making in which oxygen is substantially excluded and contains substantially no oxidized material, the petroleum distillate being the only readily volatile solvent therein.

9. The coating composition of claim 1 in which an acidic pigment is present to hasten the oxidation of the condensation derivative of rubber.

10. The coating composition of claim 2 in which an acidic pigment is present to hasten the oxidation of the condensation derivative of rubber.

11. The coating composition of claim 3 in which an acidic pigment is present to hasten the oxidation of the condensation derivative of rubber.

12. A coating composition containing an acidic pigment, a basic pigment and a condensation derivative of rubber which is substantially unoxidized.

13. A coating composition containing a substantially unoxidized condensation derivative of rubber, which rubber derivative is free from water-soluble ingredients formed in the conversion of rubber to such a derivative and is mixed into the coating composition in a state substantially free from colored impurities.

14. A coating composition, the liquid vehicle of which contains at least 50% by weight of petroleum solvent and the non-volatile portion of which is composed chiefly of a condensation derivative of rubber which is substantially unoxidized.

15. A coating composition which contains in eighty parts of volatile vehicle at least twenty parts by weight of a condensation derivative of rubber which is substantially unoxidized.

16. A coating composition which contains in eighty parts of volatile vehicle at least twenty parts by weight of a condensation derivative of rubber which is substantially unoxidized, such vehicle being composed largely of a petroleum solvent.

17. A coating composition which comprises a condensation derivative of rubber sufficiently soluble in petroleum distillate to be applied in a vehicle composed entirely of petroleum distillate which coating composition contains sufficient acidic pigment to render a film of the coating composition resistant to petroleum solvent after 24 hours exposure to light.

18. The method of making a coating composition which comprises intimately mixing a color into a condensation derivative of rubber, intimately mixing another color into a condensation derivative of rubber and dissolving the differently colored rubber derivatives in a vehicle.

19. The method of forming a protective coating which comprises forming a film containing a vehicle, an acidic pigment, basic pigment and a condensation derivative of rubber which is substantially unoxidized and hardening the film by oxidation of the rubber derivative.

20. An object coated with an oxidized rubber derivative formed by the oxidation of a condensation derivative of rubber in the presence of an acidic pigment and a basic pigment.

21. A coating composition containing a substantially unoxidized chlorine-containing condensation derivative of rubber which rubber derivative is free from water soluble ingredients formed in the conversion of rubber to such a derivative, is obtainable by quenching with water the product of the reaction of chlorostannic acid on rubber in solution and is incorporated in the coating composition in a state substantially free from colored impurities.

22. A coating composition, the liquid vehicle of which contains at least 50% by weight of petroleum solvent and the non-volatile portion of which is composed chiefly of a substantially unoxidized chlorine-containing condensation derivative of rubber obtainable by quenching with water the product of the reaction of chlorostannic acid on rubber in solution.

23. A coating composition which contains at least 20 percent by weight of a substantially unoxidized chlorine-containing condensation derivative of rubber obtainable by quenching with water the product of the reaction of chlorostannic acid on rubber in solution.

24. A coating composition which contains at least 20 percent by weight of a substantially unoxidized chlorine-containing condensation derivative of rubber obtainable by quenching with water the product of the reaction of chlorostannic acid on rubber, in a vehicle composed essentially of a petroleum solvent.

25. A coating composition which comprises a substantially unoxidized condensation derivative of rubber which is soluble in petroleum solvent and sufficient acidic pigment to render a film of the coating composition resistant to petroleum solvent after 24 hours exposure to light.

HERBERT A. ENDRES.